US011076431B2

(12) United States Patent
Tang

(10) Patent No.: US 11,076,431 B2
(45) Date of Patent: Jul. 27, 2021

(54) PERFORMING D2D COMMUNICATION BASED ON RESOURCE USAGE OF RESOURCE POOL

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 72 days.

(21) Appl. No.: 16/122,352

(22) Filed: Sep. 5, 2018

(65) Prior Publication Data
US 2019/0021111 A1  Jan. 17, 2019

Related U.S. Application Data

(63) Continuation of application No. PCT/CN2016/094952, filed on Aug. 12, 2016.

(30) Foreign Application Priority Data

Mar. 18, 2016  (CN) ............... PCT/CN2016/076807
Apr. 15, 2016  (CN) ............... PCT/CN2016/079456
May 12, 2016  (CN) ............... PCT/CN2016/081878

(51) Int. Cl.
*H04W 74/08*  (2009.01)
*H04W 72/00*  (2009.01)
(Continued)

(52) U.S. Cl.
CPC ......... *H04W 74/085* (2013.01); *H04W 24/00* (2013.01); *H04W 28/02* (2013.01);
(Continued)

(58) Field of Classification Search
CPC ... H04W 74/085; H04W 24/00; H04W 28/02; H04W 92/18; H04W 72/00; H04W 72/02; H04W 72/04; H04W 72/121; H04W 72/18
See application file for complete search history.

(56) References Cited

U.S. PATENT DOCUMENTS 10,057,076 B2 *  8/2018  Sartori ............... H04W 72/085
2005/0076081 A1 *  4/2005  Rui ................... H04L 29/06027
709/204
(Continued)

FOREIGN PATENT DOCUMENTS

CN  102547871 A  7/2012
CN  103686689 A  3/2014
(Continued)

OTHER PUBLICATIONS

International Search Report in international application No. PCT/CN2016/094952, dated Dec. 12, 2016.
(Continued)

*Primary Examiner* — Jenee Holland
(74) *Attorney, Agent, or Firm* — Ladas & Parry LLP

(57) ABSTRACT

Provided are a method for D2D communication, and a D2D device. The method comprises: a D2D device determining a target resource of a resource pool, wherein the resource pool is used for D2D communication, and the target resource is an occupied resource in the resource pool or a conflict resource in the resource pool, with the conflict resource being a resource simultaneously occupied by a plurality of D2D signals in the resource pool; and the D2D device determining a resource usage parameter of the resource pool according to the target resource, wherein the resource usage parameter is used for indicating a ratio of the occupied resource to the total resources of the resource pool, or the
(Continued)

First D2D device determines a target resource of a resource pool — 110

The first D2D device determines a resource usage parameter of the present resource pool according to the target resource — 120 resource usage parameter is used for indicating a ratio of the conflict resource to the total resources of the resource pool.

30 Claims, 2 Drawing Sheets

(51) Int. Cl.
| | |
|---|---|
| *H04W 28/02* | (2009.01) |
| *H04W 72/02* | (2009.01) |
| *H04W 72/04* | (2009.01) |
| *H04W 24/00* | (2009.01) |
| *H04W 72/12* | (2009.01) |
| *H04W 92/18* | (2009.01) |

(52) U.S. Cl.
CPC .......... *H04W 72/00* (2013.01); *H04W 72/02* (2013.01); *H04W 72/04* (2013.01); *H04W 72/121* (2013.01); *H04W 92/18* (2013.01)

(56) References Cited

U.S. PATENT DOCUMENTS

| | | | |
|---|---|---|---|
| 2009/0265458 A1* | 10/2009 | Baker | H04L 47/18 709/224 |
| 2013/0148566 A1 | 6/2013 | Doppler | |
| 2014/0094183 A1 | 4/2014 | Gao | |
| 2014/0213221 A1* | 7/2014 | Chai | H04W 76/14 455/411 |
| 2014/0324974 A1* | 10/2014 | Park | H04L 67/1074 709/204 |
| 2015/0215903 A1 | 7/2015 | Zhao et al. | |
| 2015/0334760 A1 | 11/2015 | Sartori et al. | |
| 2015/0382173 A1* | 12/2015 | Wang | H04W 56/002 370/329 |
| 2016/0044694 A1* | 2/2016 | Park | H04W 72/10 370/329 |
| 2016/0044737 A1 | 2/2016 | Kwon | |
| 2016/0143052 A1 | 5/2016 | Yilmaz et al. | |
| 2016/0157185 A1* | 6/2016 | Chae | H04W 72/1278 370/311 |
| 2016/0278121 A1* | 9/2016 | Agiwal | H04W 8/005 |
| 2016/0338078 A1* | 11/2016 | Wang | H04W 72/085 |
| 2016/0338094 A1* | 11/2016 | Faurie | H04W 72/085 |
| 2017/0079016 A1* | 3/2017 | Nord | H04W 72/042 |
| 2017/0150340 A1* | 5/2017 | Park | H04W 8/005 |
| 2017/0215098 A1* | 7/2017 | Huang | H04W 76/14 |
| 2017/0230939 A1 | 8/2017 | Rudolf et al. | |
| 2017/0230957 A1* | 8/2017 | Wakabayashi | H04W 28/021 |
| 2017/0280423 A1 | 9/2017 | Zhao et al. | |
| 2017/0295553 A1* | 10/2017 | Lee | H04W 56/001 |
| 2017/0295567 A1* | 10/2017 | Chen | H04W 4/70 |
| 2018/0027429 A1* | 1/2018 | Li | H04W 40/22 455/426.1 |

FOREIGN PATENT DOCUMENTS

| | | |
|---|---|---|
| CN | 103843444 A | 6/2014 |
| CN | 104079503 A | 10/2014 |
| CN | 104640098 A | 5/2015 |
| CN | 104641692 A | 5/2015 |
| CN | 104812076 A | 7/2015 |
| CN | 104854916 A | 8/2015 |
| CN | 105101430 A | 11/2015 |
| CN | 105122915 A | 12/2015 |
| CN | 105336548 A | 2/2016 |
| CN | 105338633 A | 2/2016 |
| CN | 105338639 A | 2/2016 |
| CN | 105357711 A | 2/2016 |
| CN | 105407488 A | 3/2016 |
| EP | 3179794 A1 | 6/2017 |
| JP | 2014233012 A | 12/2014 |
| RU | 2545187 C1 | 3/2015 |
| TW | 201412165 A | 3/2014 |
| TW | 201412170 A | 3/2014 |
| WO | 2015000130 A1 | 1/2015 |
| WO | 2015139268 A1 | 9/2015 |
| WO | 2015139289 A1 | 9/2015 |
| WO | 2015140039 A1 | 9/2015 |
| WO | 2015167747 A1 | 11/2015 |
| WO | 2015170548 A1 | 11/2015 |
| WO | 2015196452 A1 | 12/2015 |
| WO | 2016015664 A1 | 2/2016 |
| WO | 2016019620 A1 | 2/2016 |
| WO | 2016020754 A1 | 2/2016 |
| WO | 2016021700 A1 | 2/2016 |
| WO | 2016022849 A1 | 2/2016 |

OTHER PUBLICATIONS

The Written Opinion of the International Search Authority in international application No. PCT/CN2016/094952, dated Dec. 12, 2016.
International Search Report in international application No. PCT/CN2016/076807, dated Dec. 13, 2016.
The Written Opinion of the International Search Authority in international application No. PCT/CN2016/076807, dated Dec. 13, 2016.
International Search Report in international application No. PCT/CN2016/079456, dated Dec. 5, 2018.
The Written Opinion of the International Search Authority in international application No. PCT/CN2018/079456, dated Dec. 5, 2016.
International Search Report in international application No. PCT/CN2016/081878, dated Dec. 14, 2016.
The Written Opinion of the International Search Authority in international application No. PCT/CN2016/081878, dated Dec. 14, 2016.
Supplementary European Search Report in European application No. 16894134.2, dated Oct. 23, 2018.
General Dynamics UK Ltd: "Reporting on resource pool utilization",3GPP Draft; R2-145085 Reporting on Resource Pool Utilization, 3RD Generation Partnership Project (3GPP) , Mobile Competence Centre 650, Route Des Lucioles F-06921 Sophia-Antipolis Cedex;France, vol. RAN WG2 , No. San Francisco;Nov. 17, 2014-Nov. 21, 2014 Nov. 17, 2014 (Nov. 17, 2014) ,XP050877202,Retrieved from the Internet: URL:http://www.3gpp.org/ftp/Meetings_3GPP_SYNC/RAN2/Docs/.
First Office Action of the Russian application No. 2018136604, dated Nov. 8, 2019.
First Office Action of the European application No. 16894134.2, dated Aug. 2, 2019.
CATT "Discussion on physical layer design supporting congestion control". 3GPP TSG RAN WG1 Meeting #84bis R1-162271 Busan. Korea Apr. 11-15, 2016.
Qualcomm Incorporated "Resource Pool Design for V2V", 3GPP TSG-RAN WG1 #84bis R1-163034, Apr. 11-15, 2016; Busan, South Korea.
Second Office Action of the Chinese application No. 201680065048.8, dated Jun. 12, 2020.
Second Office Action of the Canadian application No. 3016652, dated Jul. 3, 2020.
First Office Action of the Japanese application No. 2018-548139, dated Jul. 28, 2020.
Second Office Action of the European application No. 16894134.2, dated Jun. 29, 2020.
Office Action of the Taiwanese application No. 106109053, dated Jun. 1, 2020.
Office Action of the Taiwanese application No. 106109055, dated Jul. 1, 2020.
Written Opinion of in corresponding Singaporean application No. 11201807762W, dated Feb. 28, 2020.
First Office Action in corresponding Chinese application No. 201680065048.8, dated Mar. 9, 2020.
First Office Action in corresponding Indian application No. 201817039391, dated May 13, 2020.

(56) References Cited

OTHER PUBLICATIONS

Office Action of the Taiwanese application No. 106109058, dated Sep. 14, 2020.
Notice of Rejection of the Chinese application No. 201680065048.8, dated Sep. 18, 2020.
First Office Action of the Brazilian application No. BR1120180688436, dated Sep. 1, 2020.
First Office Action of the Australian application No. 2016397908, dated Dec. 8, 2020.
Sony "Discovery/Communication Resource Pool Priority Information" 3GPP TSG-RAN WG2 Meeting #88 R2-144864 San Francisco, USA, Nov. 17-21, 2014, 1 page.
Intel Corporation "Priority handling for UE autonomous resource selection" 3GPP TSG-RAN WG2 Meeting #90 R2-153286 Fukuoka, Japan, May 25-29, 2015, p. 1-5.
Third Office Action of the Chinese application No. 201680065048.8, dated Mar. 10, 2021.
Second Office Action of the Australian application No. 2016397908, dated Apr. 29, 2021.
Third Office Action of the Canadian application No. 3016652, dated Apr. 12, 2021.

\* cited by examiner

PERFORMING D2D COMMUNICATION BASED ON RESOURCE USAGE OF RESOURCE POOL

CROSS-REFERENCE TO RELATED APPLICATIONS

This application is a continuation of International Application No. PCT/CN2016/094952, filed on Aug. 12, 2016 which claims priority to International Application No. PCT/CN2016/076807, submitted to the Patent Office of the People's Republic of China on Mar. 18, 2016 and entitled "Device to Device (D2D) communication method and D2D device", International Application No. PCT/CN2016/079456, submitted to the Patent Office of the People's Republic of China on Apr. 15, 2016 and entitled "D2D communication method and D2D device", International Application No. PCT/CN2016/081878, submitted to the Patent Office of the People's Republic of China on May 12, 2016 and entitled "D2D communication method, D2D device and base station". The contents of the four International Applications are hereby incorporated by reference in their entireties.

TECHNICAL FIELD

Embodiments of the application relate to the field of wireless communications, and more particularly to a D2D communication method and a D2D device.

BACKGROUND

In 3rd Generation Partnership Project (3GPP) Release-12&13, D2D communication has been standardized. In the specification of Release-12&13, D2D resources for D2D communication may be allocated in the following two manners: one is a network-based resource allocation manner and the other is a manner of autonomous allocation by D2D devices. The network-based resource allocation manner means allocating the D2D resources by a network device, and this allocation manner is mainly applied to a scenario with coverage of a cellular network. The manner of autonomous allocation by the D2D devices may allow the D2D device to autonomously select the D2D resources, for example, the D2D device randomly selects the D2D resources on the basis of a prespecified resource allocation pattern, and this allocation manner may be applied to a scenario with the coverage of the cellular network or may be applied to scenario without coverage of the cellular network. In D2D of Release-12&13, under the condition that the D2D devices autonomously allocate the resources, since there is no central scheduling node (for example, the network device) for macro control over resource allocation, the D2D devices or a network cannot learn about usage of the D2D resources, which may easily cause the D2D resources to be used in an unreasonable manner. For example, if the D2D devices or the network cannot learn about the usage of the D2D resources, the D2D devices may not uniformly use the D2D resources, some D2D resources are heavily loaded but some D2D resources are lightly loaded. For another example, if D2D devices cannot learn about the usage of the D2D resources, two or more D2D devices may send D2D signals on overlapped resources at the same time to bring serious mutual interference. For another example, if a D2D device cannot learn about the usage of the D2D resources, when a distribution density of the D2D devices is lower, resource pools independently allocated to the D2D device may also bring serious resource waste.

BRIEF DESCRIPTION OF DRAWINGS

In order to describe the technical solutions of the embodiments of the application more clearly, the drawings required to be used in the embodiments of the application will be simply introduced below. Obviously, the drawings described below are only some embodiments of the application. Other drawings may further be obtained by those of ordinary skilled in the art according to these drawings without creative work.

DETAILED DESCRIPTION

Figure 1:
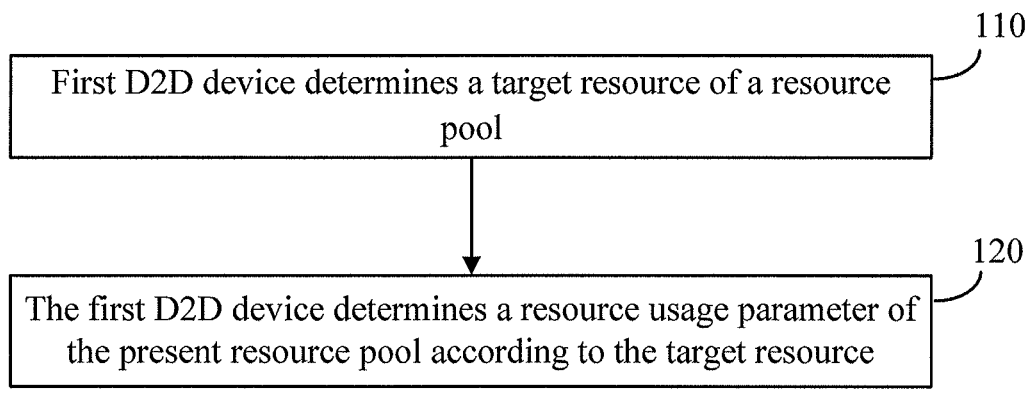
FIG. 1 illustrates a schematic flowchart of a D2D communication method according to an embodiment of the application.

It is to be understood that the technical solutions of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced LTE (LTE-A) system, a Universal Mobile Telecommunication System (UMTS) and 5th-Generation.

It is also to be understood that, in the embodiments of the application, D2D devices includes, but not limited to, a User Device (UE), a Mobile Station (MS), a mobile terminal, a mobile telephone, a handset, portable device and the like. The UE may communicate with one or more core networks through a Radio Access Network (RAN). For example, the UE may be a mobile telephone (or referred to as a "cellular" telephone) and a computer with a wireless communication function, or the UE may be a portable, pocket, handheld, computer-built-in or vehicle-mounted mobile device.

In some embodiments, D2D communication may be V2V communication or Vehicle to X (V2X) communication. In V2X communication, X may generally means any device with a wireless receiving and sending capability, and for example, but not limited to, a wireless device moving at a low speed, vehicle-mounted device moving at a high speed or a network control node with a wireless transmitting and receiving capability.

In the embodiments of the application, the network device may be a Base Transceiver Station (BTS) in the GSM or CDMA system, may be allodeB in the WCDMA system, may be an Evolved Node B (eNB or e-NodeB) in the LTE system, or may be an access point configured to provide access service in the 5G system, which will not be limited in the embodiments of the application.

The application provides a D2D communication method and a D2D device, so as to solve the problem that D2D device cannot learn about usage of D2D resources under the condition of autonomously allocating the resources.

A first aspect provides a D2D communication method, which may include that: a first D2D device determines a target resource of a resource pool, wherein the resource pool may be used for D2D communication and the target resource may be an occupied resource in the resource pool or a collision resource in the resource pool, wherein the collision resource may be a resource, that is simultaneously occupied by multiple D2D signals, in the resource pool; and the first D2D device determines a resource usage parameter of the resource pool according to the target resource, wherein the resource usage parameter may be configured to indicate a proportion of the occupied resource to total resources of the resource pool, or the resource usage parameter may be configured to indicate a proportion of the collision resource to the total resources of the resource pool.

By determining the resource usage parameter of the resource pool, the D2D device may conveniently acquire usage of the resource pool, thereby providing a reference for subsequent load balancing and collision processing.

Alternatively, the resource pool may be a present resource pool used by the D2D device, or the resource pool may be a resource pool used by the D2D device in a specific time period, the resource usage parameter indicates the proportion of a resource occupied in the specific time period to total resources of the resource pool in the specific time period, or the resource usage parameter indicates a proportion of a collision resource in the specific time period to the total resources of the resource pool in the specific time period, that is, the resource usage parameter may be a real-time parameter detected by the D2D device or may be a parameter detected by the D2D device in a period of time, whether it is specifically a real-time resource usage parameter or a resource usage parameter in the period of time may be configured by a network or specified by a protocol, and the specific time period may be set by the network or may be specified by the protocol.

In combination with the first aspect, in some implementation modes of the first aspect, the method may further include that: when the resource usage parameter is smaller than a first threshold value, the first D2D device reports an event that the resource usage parameter is smaller than the first threshold value to a network device.

The resource usage parameter of the resource pool is smaller than the first threshold value usually because of unreasonable resource allocation. In the implementation mode, the first D2D device reports the event that the resource usage parameter is smaller than the first threshold value, and then the network device reconfigures the resources of the resource pool according to the first event, so that the D2D resources may be used more reasonably. Specifically, the network device may shrink the present resource pool or combine the resource pool with one or more other resource pools, and in such a manner, a utilization rate of the resources may be increased.

The resource pool includes at least one D2D device, and the at least one D2D device includes the first D2D device.

In combination with the first aspect, in some implementation modes of the first aspect, the method may further include that: when the resource usage parameter is smaller than the first threshold value over a preset time period, the first D2D device reports the event that the resource usage parameter is smaller than the first threshold value to the network device.

In combination with the first aspect, in some implementation modes of the first aspect, the event that the resource usage parameter is smaller than the first threshold value may be used to trigger the network device to shrink the resource pool or combine the resource pool with one or more other resource pools. In an example, the event may be used to trigger the network device to reconfigure D2D communication resources.

In combination with the first aspect, in some implementation modes of the first aspect, after the first D2D device reports the event that the resource usage parameter is smaller than the first threshold value to the network device, the method may further include that: the first D2D device temporally stops using the target resource.

The first D2D device temporally stops using the target resource in the resource pool immediately after reporting the event that the resource usage parameter is smaller than the first threshold value to the network device, and then the network device reconfigures the D2D resources; or after the first D2D device reports the event that the resource usage parameter is smaller than the first threshold value to the network device, the network device indicates one or more other D2D devices in the resource pool to temporally stop using the target resource in the resource pool, the other D2D devices may temporally stop using the resource pool immediately after receiving an indication of the network device or may temporally stop using the resource pool for a specific time period after receiving the indication of the network device, and the specific time period for which the D2D device temporally stops using the resource pool may be specified by the protocol or configured by the network.

Alternatively, after a first time period after the first D2D device reports the event that the resource usage parameter is smaller than the first threshold value to the network device, the D2D device temporally stops using the present target resource, and the first time period may be configured to the first D2D device by the network device or may be specified by the protocol.

In combination with the first aspect, in some implementation modes of the first aspect, the operation that the D2D device temporally stops using the resource pool may include that: the D2D device receives first indication information sent by the network device; and the D2D device temporally stops using the resource pool according to the first indication information. Here, the first indication information indicates the D2D device to temporally stop using the resource pool.

Alternatively, the network device may indicate part or all of the D2D devices using the resource pool to temporally stop using the resource pool, or may indicate the first D2D device to temporally stop using the resource pool.

In combination with the first aspect, in some implementation modes of the first aspect, the method may further include that: when the resource usage parameter is larger than a second threshold value, the first D2D device reports an event that the resource usage parameter is larger than the second threshold value to the network device.

In combination with the first aspect, in some implementation modes of the first aspect, the event is used to trigger the network device to reconfigure the D2D resources. In an example, the event may be used to trigger the network device to reconfigure the D2D communication resources.

The resource usage parameter of the resource pool is larger than the second threshold value usually because of unreasonable resource configuration of the resource pool. In the implementation mode, the first D2D device reports the event that the resource usage parameter is larger than the second threshold value, and then the network device reconfigures the resource pool, so that the D2D resources may be used more reasonably.

In combination with the first aspect, in some implementation modes of the first aspect, the event is used to trigger the network device to switch a working mode of the first D2D device from a second working mode to a first working mode, wherein a resource used by the first D2D device in the first working mode is allocated by the network device, and a resource used by the first D2D device in the second working mode is autonomously selected by the first D2D device.

In combination with the first aspect, in some implementation modes of the first aspect, the event is used to trigger the network device to switch the working mode of the first D2D device from the second working mode to a third working mode, wherein the resource used by the first D2D device in the second working mode is autonomously selected by the first D2D device, and the first D2D device in the third working mode performs D2D communication on the basis of a cellular network interface (Uu interface).

In combination with the first aspect, in some implementation modes of the first aspect, the method further includes that: when the resource usage parameter is larger than the second threshold value, the first D2D device reports the event that the resource usage parameter is larger than the second threshold value to the network device for the network device to improve usage of the resource pool.

In combination with the first aspect, in some implementation modes of the first aspect, the operation that the network device improves the usage of the resource pool includes that: the network device reconfigures the D2D resources.

In combination with the first aspect, in some implementation modes of the first aspect, the operation that the network device improves the usage of the resource pool includes that: the network device switches the working mode of the D2D device from the second working mode to the first working mode, wherein the resource used by the first D2D device in the first working mode is allocated by the network device, and the resource used by the first D2D device in the second working mode is autonomously selected by the first D2D device.

In combination with the first aspect, in some implementation modes of the first aspect, the operation that the network device improves the usage of the resource pool includes that: the network device switches the working mode of the first D2D device from the second working mode to the third working mode, wherein the resource used by the first D2D device in the second working mode is autonomously selected by the first D2D device, and the first D2D device in the third working mode performs D2D communication on the basis of the cellular network interface (Uu interface).

In combination with the first aspect, in some implementation modes of the first aspect, the method may further include that: when the resource usage parameter is larger than the second threshold value, the D2D device reselects a resource pool.

In the implementation mode, the second threshold value is configured for the resource pool, and when the D2D device detects that the resource usage parameter of the resource pool is larger than the second threshold value, the D2D device reselects the resource pool, so that the D2D resources may be used more reasonably.

In combination with the first aspect, in some implementation modes of the first aspect, the collision resource is a resource, that is simultaneously occupied by multiple D2D signals, in the resource pool; in other words, the collision resource is a resource, that is simultaneously occupied by multiple groups of D2D devices, in the resource pool.

In combination with the first aspect, in some implementation modes of the first aspect, the resource pool for D2D communication may include multiple resource pools.

In combination with the first aspect, in some implementation modes of the first aspect, the second threshold value may represent serious resource shortage of the resource pool or the second threshold value may represent serious resource collision in the resource pool.

In combination with the first aspect, in some implementation modes of the first aspect, the network device may reconfigure the D2D resources by adding a resource into the resource pool.

In combination with the first aspect, in some implementation modes of the first aspect, the network device may reconfigure the D2D resources by combining multiple resources in the resource pool of which the resource usage parameter is smaller than the first threshold value.

In combination with the first aspect, in some implementation modes of the first aspect, regarding the operation that the network device reconfigures the D2D resources, the network device adds part of resources in a present resource pool of the D2D device corresponding to the event of being smaller than the first threshold value into the resource pool of the D2D device corresponding to the event of being larger than the second threshold value, that is, resources in a resource pool with a low resource occupation rate may be allocated to a resource pool with a high resource occupation rate, or resources in a resource pool with a low resource collision rate may be allocated to a resource pool with a high resource collision rate.

In combination with the first aspect, in some implementation modes of the first aspect, the method may further include that: when the resource usage parameter is smaller than the second threshold value and larger than a third threshold value, the first D2D device reports an event that the resource usage parameter is smaller than the second threshold value and larger than the third threshold value to the network device, so as for the network device to indicate one or more D2D devices in the resource pool to use the resources in the resource pool in a collision avoiding manner.

The D2D device in the resource pool is indicated to use the resources in the resource pool in the collision avoiding manner, so that a resource collision condition of the resource pool may be reduced.

In combination with the first aspect, in some implementation modes of the first aspect, the method may further include that: when the resource usage parameter is smaller than the second threshold value and larger than the third threshold value, the first D2D device sends second indication information to one or more other D2D devices in the resource pool, the second indication information indicates the other D2D devices to use the resources in the resource pool in the collision avoiding manner.

The D2D devices in the resource pool is indicated to use the resources in the resource pool in the collision avoiding manner, so that the resource collision condition of the resource, pool may be reduced.

In combination with the first aspect, in some implementation modes of the first aspect, the method may further include that: when the resource usage parameter is smaller than the second threshold value and larger than the third threshold value, the first D2D device reports the event that the resource usage parameter is smaller than the second threshold value and larger than the third threshold value to the network device, so as for the network device to reconfigure the resources in the resource pool.

In the implementation mode, the D2D device reports the event that the resource usage parameter is smaller than the second threshold value and larger than the third threshold value, and the network device reconfigures the D2D resources, so that a serious occupation condition of the D2D resources may be alleviated, or a collision degree of the D2D resources may be reduced.

In combination with the first aspect, in some implementation modes of the first aspect, the operation that the first D2D device determines the resource usage parameter of the resource pool may include that: the first D2D device receives scheduling information sent by the other D2D device on a preset resource of the resource pool, the scheduling information indicates a location of a resource(s) for carrying data of the one or more other D2D devices in the resource pool; and the first D2D device determines the resource usage parameter according to the scheduling information.

In combination with the first aspect, in some implementation modes of the first aspect, the operation that the first D2D device determines the resource usage parameter of the resource pool may include that: the first D2D device detects power of a D2D signal using a resource in the resource pool; and the first D2D device determines the resource usage parameter according to the power of the D2D signal. The power of the D2D signal may be power of the D2D signal on a specific time-frequency resource, or may be power of the D2D signal.

In combination with the first aspect, in some implementation modes of the first aspect, content transmitted by each D2D device in the resource pool has a priority, and when the resource usage parameter is larger than the second threshold value, the target D2D device in the resource pool performs D2D communication in the collision avoiding manner, a priority of content transmitted by the target D2D device in the resource pool is lower than or equal to a priority threshold value.

In combination with the first aspect, in some implementation modes of the first aspect, the target D2D device may be the first D2D device.

In combination with the first aspect, in some implementation modes of the first aspect, content transmitted by each D2D device in the resource pool has a priority, and when the resource usage parameter is larger than the second threshold value, the target D2D device in the resource pool stops D2D communication, the target D2D device being D2D device of which the priority of the transmitted content is lower than or equal to the priority threshold value in the resource pool.

In combination with the first aspect, in some implementation modes of the first aspect, content transmitted by each D2D device in the resource pool has a priority, and when the resource usage parameter is smaller than the second threshold value and larger than the third threshold value, the target D2D device in the resource pool performs D2D communication in the collision avoiding manner, a priority of content transmitted by the target D2D device in the resource pool is lower than or equal to the priority threshold value.

In combination with the first aspect, in some implementation modes of the first aspect, content transmitted by each D2D device in the resource pool has a priority, and when the resource usage parameter is smaller than the second threshold value and larger than the third threshold value, the target D2D device in the resource pool stops D2D communication, a priority of content transmitted by the target D2D device in the resource pool is lower than or equal to the priority threshold value.

In combination with the first aspect, in some implementation modes of the first aspect, the priority threshold value may be preconfigured or specified by the network (for example, a base station).

In combination with the first aspect, in some implementation modes of the first aspect, information about the priority of the content transmitted by each D2D device in the resource pool may be contained in scheduling information sent by the each D2D device on a preset resource.

In combination with the first aspect, in some implementation modes of the first aspect, the D2D device sends the scheduling information on the presets resources.

In combination with the first aspect, in some implementation modes of the first aspect, the D2D device in the resource pool performs D2D communication in the collision avoiding manner under an indication of the network device.

In combination with the first aspect, in some implementation modes of the first aspect, the D2D device in the resource pool stops D2D communication under the indication of the network device.

In combination with the first aspect, in some implementation modes of the first aspect, the D2D device in the resource pool temporally stops using the resource pool under the indication of the network device, so as for the network device to combine or shrink the resource pool.

In combination with the first aspect, in some implementation modes of the first aspect, the resource pool for D2D communication includes multiple resource pools, and the multiple resource pools are obtained by dividing resources for D2D communication according to time and/or frequencies.

In combination with the first aspect, in some implementation modes of the first aspect, the resource pool for D2D communication includes one or more resource pools. For example, the resource pool for D2D communication may include only one resource pool.

In combination with the first aspect, in some implementation modes of the first aspect, the first D2D device is a D2D device in the second working mode, and the resource used by the first D2D device in the second working mode is autonomously selected by the first D2D device.

In combination with the first aspect, in some implementation modes of the first aspect, the first D2D device in the first working mode and the second working mode directly performs D2D communication through a PC5 interface.

In combination with the first aspect, in some implementation modes of the first aspect, the first D2D device in the third working mode performs D2D communication through the Uu interface.

In combination with the first aspect, in some implementation modes of the first aspect, when the resource usage parameter is larger than the second threshold value, the target D2D device in the resource pool performs D2D communication in the collision avoiding manner or stops D2D communication; or, when the resource usage parameter is smaller than the second threshold value and larger than the third threshold value, the target D2D device in the resource pool performs D2D communication in the collision avoiding manner or stops D2D communication, wherein the target D2D device is specified by the network device, and of course, the target D2D device may be the first D2D device.

In combination with the first aspect, in some implementation modes of the first aspect, the method further includes that: when the resource usage parameter is larger than the second threshold value, the first D2D device performs D2D communication in the collision avoiding manner or stops D2D communication; or, when the resource usage parameter is smaller than the second threshold value and larger than the third threshold value, the first D2D device performs D2D communication in the collision avoiding manner or stops D2D communication.

In combination with the first aspect, in some implementation modes of the first aspect, the method further includes that: when the resource usage parameter is larger than a fourth threshold value, the first D2D device reports an event that the resource usage parameter is larger than the fourth threshold value to the network device.

In combination with the first aspect, in some implementation modes of the first aspect, the method further includes that: when the resource usage parameter is larger than the fourth threshold value, the first D2D device reports a present service(s) of the D2D device to the network device, so as for the network device to switch a working mode in which the first D2D device processes at least part of the present service(s) from the second working mode to the third working mode, wherein the resource used by the first D2D device in the second working mode is autonomously selected by the first D2D device, and the first D2D device in the third working mode performs D2D communication on the basis of a cellular network interface.

In combination with the first aspect, in some implementation modes of the first aspect, the method further includes that: when the resource usage parameter is larger than the fourth threshold value, the first D2D device sends a request message to the network device, the request message being configured to request the network device to switch a working mode in which the first D2D device processes a target service from the second working mode to the third working mode, wherein the target service includes at least part of the present service(s) of the first D2D device, the resource used by the first D2D device in the second working mode is autonomously selected by the first D2D device, and the first D2D device in the third working mode performs D2D communication on the basis of the cellular network interface.

In combination with the first aspect, in some implementation modes of the first aspect, the method further includes that: when the resource usage parameter is larger than the fourth threshold value, the first D2D device reports a Quality of Service (QoS) requirement corresponding to at least part of the present service(s) to the network device.

In combination with the first aspect, in some implementation modes of the first aspect, the present service(s) is a present Vehicle to Vehicle (V2V) service(s) of the D2D device.

In some abovementioned implementation modes, the method further includes that: the first D2D device determines the fourth threshold value according to a QoS requirement of the present service(s) and a configured mapping table, wherein the mapping table is configured to indicate a mapping between the QoS requirement and the fourth threshold value.

In combination with the first aspect, in some implementation modes of the first aspect, the method further includes that: the first D2D device periodically reports the resource usage parameter of the resource pool to the network device.

In combination with the first aspect, in some implementation modes of the first aspect, the method further includes that: when the resource usage parameter is larger than the fourth threshold value, the first D2D device reports the resource usage parameter to the network device.

In combination with the first aspect, in some implementation modes of the first aspect, the method may further includes that: the first D2D device obtains a mapping relationship for indicating a Quality of Service (QoS) requirement of at least one service of the first D2D device and a fourth threshold value of the resource usage parameter.

In combination with the first aspect, in some implementation modes of the first aspect, the method may further includes that: the first D2D device determines the fourth threshold value according to a QoS requirement of a present service of the first D2D device and the mapping relationship; when the resource usage parameter is larger than the fourth threshold value, transmitting at least one of the following to the network device: the present service; a QoS requirement of at least a first part of the present service; the resource usage parameter; or a request for switching a working mode in which the first D2D device processes at least a second part of the present service to a mode of performing D2D communication on the basis of a cellular network interface.

In combination with the first aspect, in some implementation modes of the first aspect, the mapping relationship may be pre-configured by the network device, and the operation of obtaining the mapping relationship may include receiving the mapping relationship transmitted by the network device in a broadcast, multicast or unicast manner or through dedicated signaling.

In combination with the first aspect, in some implementation modes of the first aspect, the resource usage parameter may be configured to indicate a proportion of the occupied resource to total resources of the resource pool in a specific time period, or the resource usage parameter may be configured to indicate a proportion of the collision resource to the total resources of the resource pool in the specific time period.

A second aspect provides a D2D communication method, which includes that: a network device receives an event, reported by first D2D device, that a resource usage parameter of a resource pool is larger than a fourth threshold value, wherein the resource pool is used for D2D communication, the resource usage parameter is configured to indicate a proportion of an occupied resource of the resource pool to total resources of the resource pool, or the resource usage parameter is configured to indicate a proportion of a collision resource of the resource pool to the total resources of the resource pool, wherein the collision resource is a resource, that is simultaneously occupied by multiple D2D signals, in the resource pool; and the network device adjusts the resources in the resource pool or a service of device using the resource pool according to the event.

In combination with the second aspect, in some implementation modes of the second aspect, the method further includes that: the network device receives a present service(s) reported by the first D2D device.

In combination with the second aspect, in some implementation modes of the second aspect, the method further includes that: the network device receives a request message sent by the first D2D device, the request message being configured to request the network device to switch a working mode in which the first D2D device processes a target service from a second working mode to a third working mode, wherein the target service is at least part of the present service(s) of the first D2D device, a resource used by the first D2D device in the second working mode is autonomously selected by the first D2D device, and the first D2D device in the third working mode performs D2D communication on the basis of a cellular network interface.

In combination with the second aspect, in some implementation modes of the second aspect, the method further includes that: the network device receives a QoS requirement corresponding to at least part of the present service(s) reported by the first D2D device.

In combination with the second aspect, in some implementation modes of the second aspect, the operation that the network device adjusts the resources in the resource pool or the service of the device using the resource pool according to the event includes that: the network device switches a working mode in which the first D2D device processes at least part of the present service(s) from the second working mode to the third working mode according to the event, wherein the resource used by the first D2D device in the second working mode is autonomously selected by the first D2D device, and the first D2D device in the third working mode performs D2D communication on the basis of the cellular network interface.

In combination with the second aspect, in some implementation modes of the second aspect, the present service(s) is/are a present V2V service(s) of the first D2D device.

In combination with the second aspect, in some implementation modes of the second aspect, the event that the resource usage parameter of the resource pool is larger than the fourth threshold value is determined by the first D2D device on the basis of a configured mapping table, wherein the mapping table is configured to indicate a mapping between the QoS requirement corresponding to the present service(s) of the first D2D device and the fourth threshold value.

In combination with the second aspect, in some implementation modes of the second aspect, the method further includes that: the network device receives a resource usage parameter, periodically reported by the first D2D device, of a target resource pool.

In combination with the second aspect, in some implementation modes of the second aspect, the method further includes that: when the resource usage parameter is larger than the fourth threshold value, the network device receives the resource usage parameter reported by the first D2D device.

A third aspect provides a D2D device, which includes units configured to execute the method in the first aspect.

A fourth aspect provides a network device, which includes units configured to execute the method in the second aspect.

A fifth aspect provides a D2D device, which includes a memory, a processor and a transceiver, the memory is configured to store a program, the processor is configured to execute the program, and when the program is executed, the processor executes the method in the first aspect in conjunction with the transceiver.

A sixth aspect provides network device, which includes a memory, a processor and a transceiver, the memory is configured to store a program, the processor is configured to execute the program, and when the program is executed, the processor executes the method in the second aspect in conjunction with the transceiver.

A seventh aspect provides a computer-readable medium, which is configured to execute program codes executable by a D2D device, the program codes including instructions for executing the method in the first aspect.

An eighth aspect provides a computer-readable medium, which is configured to store program codes executable by a D2D device, the program codes including instructions for executing the method in the second aspect.

A ninth aspect provides a chip, which includes a processor configured to call a computer program from a memory and run the computer program, to cause a device provided with the chip to execute the method in the first aspect.

FIG. 1 illustrates a schematic flowchart of a D2D communication method according to an embodiment of the application. The method of FIG. 1 includes the following operations.

In 110, a first D2D device determines a target resource of a resource pool. The target resource is an occupied resource in the resource pool or a collision resource in the resource pool. The collision resource is a resource, that is simultaneously occupied by multiple D2D signals, in the resource pool, and the resource pool is any resource pool in resource pools for D2D communication.

In 120, the first D2D device determines a resource usage parameter of the resource pool according to the target resource. The resource usage parameter is indicates a proportion of the occupied resource to total resources of the resource pool, or the resource usage parameter indicates a proportion of the collision resource to the total resources of the resource pool.

It is to be understood that the term "first D2D device" in the embodiment of the application is used only for convenience of description and any D2D device using a resource in the resource pool may execute operations related to the first D2D device, which will not be limited in the embodiment of the application.

The resource pool may be a present resource pool used by the D2D device, or the resource pool may be a resource pool used by the D2D device in a specific time period, the resource usage parameter indicates the proportion of a resource occupied in the specific time period to total resources of the resource pool in the specific time period, or the resource usage parameter indicates a proportion of a collision resource in the specific time period to the total resources of the resource pool in the specific time period, that is, the resource usage parameter may be a real-time parameter detected by the D2D device or may be a parameter detected by the D2D device in a period of time, whether it is specifically a real-time resource usage parameter or a resource usage parameter in the period of time may be configured by a network or specified by a protocol, and the specific time period may be set by the network or may be specified by the protocol.

In the embodiment of the disclosure, the first D2D device detects the resource usage parameter of the resource pool and reports a detection result to the network device, so as for the network device to learn about this condition and perform corresponding processing.

For ensuring accuracy of the resource usage parameter reported by the D2D device, multiple D2D devices may report resource usage parameters detected by them to the network device, and the network device determines real resource usage of the resource pool according to the resource usage parameters reported by the multiple D2D devices.

When a D2D device works in a cellular network, the D2D device may have two working modes. In the first working mode (or referred to as a working mode 1), the resource of the D2D device may be allocated by the network device; and in the second working mode (or referred to as a working mode 2), the resource used by the D2D device may be autonomously selected from a prespecified resource pool by the D2D device. The working mode of the D2D device is not specifically limited in the application. In some embodiments, the first D2D device in the application may be a D2D device in the second working mode. It is to be understood that resources used in the first working mode and the second working mode may be different from each other.

When the D2D device is out of coverage of the cellular network, the D2D device may work in the second working mode.

In some embodiments, available D2D resources may be divided into different resource pools according to time and/or frequencies, and before D2D communication, the D2D device may select a resource pool at first. It is to be noted that a number of D2D resource pools for D2D communication is not specifically limited in the embodiment of the application and there may be only one resource pool or multiple resource pools. For the D2D device, when all of the available D2D resources form a resource pool, the D2D device does not have to select the resource pool and may directly select a proper resource from the resource pool for D2D communication.

In some embodiments, the resource usage parameter of the resource pool may mean the proportion of the collision resource of the resource pool to the total resources of the resource pool (referred to as a resource collision rate hereinafter); and the resource usage parameter of the resource pool may mean the proportion of the occupied resource of the resource pool to the total resources of the resource pool (referred to as a resource occupation rate hereinafter). When there is only one resource pool, the resource collision rate and resource occupation rate mentioned above may mean a collision and occupation rate of a resource presently available for the D2D device.

In some embodiments, a first threshold value P1 may be set for configuration of a corresponding resource usage parameter for each resource pool. When the resource usage parameter of a certain resource pool is smaller than P1, it may be indicated that the resource pool is idle, a resource utilization rate of the resource pool is not high and resources are wasted seriously. Different resource pools may correspond to the same or different P1(s).

In some embodiments, a first threshold value P1 may be set for configuration of a corresponding resource occupation rate for each resource pool. When the resource occupation rate of a certain resource pool is smaller than P1, it may be indicated that the resource pool is idle, the resource utilization rate of the resource pool is not high and the resources are wasted seriously. Different resource pools may correspond to the same or different P1(s).

In some embodiments, multiple threshold values may be set for configuration of the corresponding resource usage parameter for each resource pool, for example, a fifth threshold value and sixth threshold value of the device, the first threshold value being larger than the sixth threshold value. When the resource usage parameter of a certain resource pool is smaller than the sixth threshold value, the D2D device reports an event of being smaller than the sixth threshold value, and the network device may combine the resource pool where the present D2D device is located. When the resource usage parameter of a certain resource pool is smaller than the fifth threshold value and larger than the sixth threshold value, the D2D device reports an event of being smaller than the fifth threshold value and larger than the sixth threshold value, the network device may shrink the resource pool where the present D2D device is located. That is, different threshold values may be set to determine an idle condition of the resource pool, and for different threshold values, the network device may adopt different processing manners, so that resource allocation flexibility is further improved.

In some embodiments, a second threshold value P2 and a third threshold value P3 may be set for configuration of a corresponding resource collision rate for each resource pool. When the resource collision rate of a certain resource pool is larger than P2, it may be indicated that a collision condition or occupation condition of the resource pool is very serious; and when the resource collision rate of a certain resource pool is smaller than P2 and larger than P3, it may be indicated that a collision condition or occupation condition of the resource pool is more serious. Different resource pools may correspond to the same or different P2 or P3, where P2 is larger than P3.

In some embodiments, threshold values may be set for both the resource collision rate and the resource occupation rate of the resource pool, and the threshold value set for the resource occupation rate may be the same as or different from the threshold value for the resource collision rate, that is, P1 for the resource collision rate and P1 for the resource occupation rate may be the same or different, P2 for the resource collision rate and P2 for the resource occupation rate may be the same or different, and P3 for the resource collision and P3 for the resource occupation rate may be the same or different. Of course, only one of the threshold value for the resource collision rate and the threshold value for the resource occupation rate may be set for the resource pool.

In some embodiments, P2 and P3 are configured for each resource pool, or, only one of P2 and P3 may be configured for each resource pool. Descriptions will be made below with configuration of both P2 and P3 for each resource as an example.

In some embodiments, the first threshold value P1 is configured for each resource pool. Here, magnitudes of P1 and P3 may not be limited.

In some embodiments, P1, P2 and P3 may all be configured for each resource pool. Here, P1 is smaller than or equal to P3, and P2 is larger than P3.

In some embodiment, when the first D2D device detects that the resource occupation rate of a certain resource pool is smaller than P1, the D2D device may report this event to the network device through an air interface. Then, the network device may execute a series of measures to improve the condition of the low resource occupation rate of the resource pool and increase the utilization rate of the resources.

In some embodiments, when the resource usage parameter is smaller than the first threshold value within a preset time period, the first D2D device reports the event that the resource usage parameter is smaller than the first threshold value to the network device. The first D2D device reports the event when detecting that the resource occupation rate is smaller than the first threshold value over the preset time period, or the first D2D device reports the event when detecting that an average occupation rate of the resource is smaller than the first threshold value within the preset time period. Therefore, whether it is a real resource occupation condition or not may be detected by virtue of the preset resource occupation rate in the preset time period, and therefore a real condition of the resource may be accurately reported to the network device, and the first D2D device is prevented from making a wrong report to the network device.

In some embodiments, the event that the resource usage parameter is smaller than the first threshold value is used to trigger the network device to shrink the resource pool or combine the resource pool with one or more other resource pools.

In some embodiments, after the first D2D device reports the event that the resource usage parameter is smaller than the first threshold value to the network device, the method further includes that: the first D2D device temporally stops using the target resource in the resource pool.

Specifically, the D2D device may temporally stop using the target resource immediately after reporting the event that the resource usage parameter is smaller than the first threshold value to the network device; or the D2D device may temporally stop using the target resource after a first time period after reporting the vent; and first indication information sent by the network device may further be received, the first indication information indicates the first D2D device to temporally stop using the presently used resource pool, and the D2D device may temporally stop using the target resource according to the first indication information, so as for the network device to shrink the resource pool or combine the resource pool with one or more other resource pools. How to temporally stop using the present resource pool by the D2D device is not limited in the embodiment of the application.

In some embodiments, when the first D2D device detects that the resource collision rate and/or resource occupation rate of a certain resource pool are/is larger than P3 but smaller than P2, the first D2D device may report this event to the network device through the air interface. Then, the network device or the first D2D device executes a series of measures to improve the resource occupation condition or collision condition of the resource pool.

In some embodiments, when the network device/first D2D device detects at the air interface that the resource collision rate/resource occupation rate of a certain resource pool is larger than P2, the network device/first D2D device may start a resource pool reallocation/resource pool reselection process.

In some embodiments, when the first D2D device detects that the resource collision rate and/or resource occupation rate of the first resource pool are/is larger than P3 but smaller than P2, the first D2D device may report this event to the network device through the air interface; and when a second D2D device detects that the resource occupation rate of the second resource pool is smaller than P1, the second D2D device may report this event to the network device through the air interface; and the network device, the first D2D device or the second D2D device may divide part of resources of the second resource pool into the first resource pool. In such a manner, the resource collision rate/resource occupation rate of the first resource pool may be reduced, the resource occupation rate of the second resource pool may be increased, and the utilization rate of the whole resource pool may further be increased.

A configuration manner for P1, P2 and P3 corresponding to the resource pool will be introduced below. It is to be understood that at least one of P1, P2 or P3 may be configured for each resource pool. For example, P1 or P2 may be configured for each resource pool, or P1, P2, P3 and the like may be configured for each resource pool. Moreover, magnitudes of each of P1, P2 and P3 configured for each resource pool may be the same or different. Also, only P1 is configured for some of the resource pools, only P2 is configured for some of the resource pools. There are no limits made in the embodiment of the application.

In some embodiments, when the D2D device is in the coverage of the cellular network and the D2D resources are allocated by the network device, the network device may divide the whole available D2D resources into different resource pools and configure corresponding P1, P2 and P3 for each resource pool. In some embodiments, the whole available D2D resources may form a resource pool, and it is unnecessary to divide it into different resource pools.

In some embodiments, if the D2D device is out of the coverage of the cellular network, the D2D resource pools may be pre-allocated, that is, the available D2D resources are divided into different resource pools in advance. Furthermore, P1, P2 and P3 corresponding to each resource pool may also be preset. In some embodiments, the whole available D2D resources may form a resource pool, and it is unnecessary to divide it into different resource pools.

A detection manner for the resource collision rate/resource occupation rate will be introduced below.

In some embodiments, before data is sent, a sender may be specified to send scheduling information, which may also be referred to as scheduling assignment, in a preset resource of the resource pool. The scheduling assignment may indicate a location of the resource for carrying the data to a receiver. In such a manner, the receiver may receive the data at the corresponding location according to the scheduling information. In an example, the scheduling information may further include modulation and demodulation information of the data and the like. Therefore, in a process of receiving the scheduling information, the receiver may learn about specific resources which have been occupied or specific resources with collisions.

In some embodiments, the resource collision rate and the resource occupation rate may also be detected in a spectrum power sensing manner. For example, the D2D device may also detect a magnitude of spectrum power on the corresponding resource of the resource pool to judge whether the present resource is occupied and/or the resource has a collision.

In some embodiments, it may be specified that the receiver is only in a receiving state and does not send any signal, so that detection reliability may be ensured.

In some embodiments, a manner for the first D2D device to detect the resource collision rate and/or resource occupation rate of the resource pool may be configured by the network device or may be preset. For example, under the condition of existence of the coverage of the cellular network, the detection manner may be configured by the network device; and under the condition of no coverage of the cellular network, the detection manner may be preset.

A corresponding processing manner after the resource collision rate and/resource occupation rate is detected will be introduced below.

In some embodiments, if the D2D device detects that in the resource pool, the resource collision rate/resource occupation rate is larger P3 and smaller than P2, in a scenario with the coverage of the cellular network, the first D2D device may report this event to the network device. After receiving the report, the network device may reconfigure the D2D resources, for example, allocating more resources to the resource pool. Or, the network device may indicate the D2D device(s) using the resource pool at this moment to perform D2D communication in a collision avoiding manner. The collision avoiding manner is not specifically limited in the embodiment of the application. For example, when the D2D device(s) using the resource pool at this moment is/are required to send data through a D2D air interface(s), the D2D device(s) may send the data with a random time delay; or, the D2D device(s) may be required to send the data on the basis of a probability P4. For example, P4 is 0.5, the D2D device(s) generate(s) a random number between 0 and 1 before sending the data, and when the random number falls between 0 to 0.5, the D2D device(s) send(s) the data, otherwise the data is not sent, where P4 may be configured by the network device or may be preset. P4 may also be 0, and at this moment, the D2D device(s) may stop D2D communication or stop D2D data transmission.

In some embodiments, if the first D2D device detects that in the resource pool, that the resource collision rate/resource occupation rate is larger than P3 and smaller than P2, in a scenario with the coverage of the cellular network, the first D2D device may send a signal in a special format at the D2D air interface, for example, scheduling information (or referred to as scheduling assignment) in a special format, to warn the other D2D device using the resource pool that there may be insufficient resources in the resource pool. After it is detected that there is a D2D device sending a signal in this special format which is prespecified in the resource pool, the D2D device using the resource pool at this moment may perform D2D communication in the collision avoiding manner. For example, when it is necessary to send the data through the D2D air interface, the D2D device may send the data with the random time delay or send the data according to a certain probability P4 (P4 may be configured by the network device or may be preset). P4 may be 0, and at this moment, the D2D device may stop D2D communication or stop D2D data transmission.

In some embodiments, if the D2D device detects that in the resource pool, the resource occupation rate is smaller than P1, in a scenario with the coverage of the cellular network, the D2D device may report this event to the network device. After receiving the report, the network device may reconfigure the D2D resources, for example, shrinking the resource pool or combining multiple resources of which the resource occupation rates are smaller than P1. Moreover, the network device may also indicate the D2D device using the resource pool at this moment to temporally stop using the resource pool. The manner of temporally stopping using the resource pool is not specifically limited in the embodiment of the application. For example, the first D2D device may temporally stop using the resource pool immediately after reporting the event, or the first D2D device temporally stops using the resource pool after the first time period after reporting the event, or the first D2D device temporally stops using the resource pool according to the indication information sent by the network device. Of course, other D2D device(s) in the resource pool may also temporally stop using the resource pool.

In some embodiments, after receiving a report (the report may be a report that the resource collision rate/resource occupation rate is larger than P2, or may be a report that the resource collision rate/resource occupation rate is between P2 and P3, or may be a report that the resource occupation rate is smaller than P1, or may be a report that an occupation probability of the first resource pool is larger than P2 and an occupation probability of the second resource pool is smaller than P1), the network device may further schedule the D2D device in a second working mode to a first working mode. Since the D2D resources may directly be scheduled by the network device in the first working mode, nonuniform distribution of the D2D resources may be effectively avoided. In addition, after the D2D device is scheduled from the second working mode to the first working mode, the number of D2D devices in the second working mode may be reduced, and thus a resource occupation/collision probability of the resource pool corresponding to the second working mode is reduced.

It is to be understood that the D2D device in either the first working mode or the second working mode directly performs D2D communication. Specifically, the D2D device in either the first working mode or the second working mode directly performs D2D communication through a PC5 interface.

In R-14, there is also a special D2D working mode, referred to as a third working mode hereinafter. In the third working mode, the D2D device interacts through the network device, that is, device to network device to device communication is implemented directly by virtue of uplink and downlink data links of an existing cellular network. This is referred to as cellular network interface (Uu or UU)-based D2D communication. After receiving a report (the report may be a report that the resource collision rate/resource occupation rate is larger than P2, or may be a report that the resource collision rate/resource occupation rate is between P2 and P3, or may be a report that the resource occupation rate is smaller than P1, or may be a report that an occupation probability of the first resource pool of the first D2D device is larger than P2 and an occupation probability of the second resource pool is smaller than P1), the network device may further schedule the D2D device in the second working mode to the third working mode on the basis of the Uu interface. Therefore, not only may D2D communication quality be ensured, but also the resource occupation/collision probability of the resource pool corresponding to the second working mode may be reduced.

In a D2D communication process, transmitted contents (or services) may have priorities, and priority information may be obtained from the scheduling information included in the scheduling assignment. If the D2D device detects that in the resource pool, the resource collision rate/resource occupation rate is larger than P2 (or between P2 and P3), the target D2D device may perform D2D communication in the collision avoiding manner or stop D2D communication to reduce the collision probability or the resource occupation rate. The target D2D device may be a D2D device of which the priority of the transmitted content is low. For example, the target D2D device may be a D2D device of which the priority of the transmitted content is lower than a priority threshold value which is preset or indicated by the network device. The target D2D device may be the first D2D device.

In some embodiments, if the first D2D device detects that in the resource pool, the resource collision rate/resource occupation rate is smaller than P1, the first D2D device may not temporally stop using the resource pool and continue performing D2D communication, and at this moment, the first D2D device may be a D2D device of which the priority of the transmitted content is higher than the preset priority threshold value and may contain the priority threshold value in the scheduling information for sending to one or more other D2D device(s); and if the D2D device detects that in the resource pool, the resource collision rate/resource occupation rate is P1, the target D2D device may temporally stop using the resource pool or stop D2D communication, and at this moment, the target D2D device may be a D2D device of which the priority of the transmitted content is lower than the priority threshold value which is preset or indicated by the network device.

In some embodiments, if the first D2D device detects that in the resource pool, the resource collision rate/resource occupation rate is smaller than P1, the network device may indicate the first D2D device to continue performing D2D communication, that is, the first D2D device continues using the resource pool, and resources in one or more other resource pools of which the resource collision rates/resource occupation rates are smaller than P1 may be combined into the resource pool of the first D2D device.

In addition, there may be multiple manners for performing D2D communication in the collision avoiding manner. For example, when being required to send the data through the D2D air interface, the D2D device may send the data with a random time delay or send the data according to a certain probability P4 (P4 may be configured by the network device or may be preset). P4 may be 0, and at this moment, the D2D device may stop D2D communication or stop D2D data transmission.

In some embodiments, if the D2D device detects that in the resource pool, the resource collision rate/resource occupation rate is larger than P2, it is indicated that existing D2D resources are in serious shortage. In a scenario with the coverage of the cellular network, the D2D device may report this event to the network device, and the network device reconfigures the D2D resources and indicates the D2D device to temporally stop D2D communication until reconfiguration of the D2D resources is completed.

In some embodiments, In a scenario without coverage of the cellular network, if the D2D device detects that in the resource pool, the resource collision rate/resource occupation rate is larger than P2, it is indicated that the resource pool has been seriously congested and the D2D device may reselect a resource pool or reselect a resource. In a scenario without coverage of the cellular network, the D2D device detects the resource collision rate/resource occupation rate of the resource pool at a time interval, and the specific time interval may be preset.

In some embodiments, if the D2D device detects that in the resource pool, the resource collision rate/resource occupation rate is larger than a resource parameter usage threshold value, this event may be reported to the network device, so as for the network device to switch at least part of the present service(s) of the D2D device from the second working mode to the third working mode.

It is to be understood that the second working mode mentioned here may be the second working mode (the working mode 2) described above and the third working mode mentioned here may be the third working mode (the working mode 3) described above, i.e., a Uu-interface-based D2D communication mode.

Alternatively, when the resource usage parameter is larger than a fourth threshold value, the D2D device reports an event that the resource usage parameter is larger than the fourth threshold value to the network device, the fourth threshold value may be understood as a threshold value triggering the first D2D device to report the present service (s) of the D2D device to the network device, and the fourth threshold value may be the same as or different from the second threshold value or the third threshold value, that is, the threshold value for reallocating the D2D communication resources by the network device may be the same as or different from the threshold value for reporting the present service(s) by the D2D device, which will not be limited in the embodiment of the application.

The fourth threshold value is not specifically limited in the embodiment of the application. In some embodiments, the fourth threshold value may be the second threshold value mentioned above, i.e., P2, and P2 may represent that the existing D2D resources are in serious shortage.

In some embodiments, a mapping table may be preset, and the mapping table may describe a mapping between a QoS requirement of a service and a resource collision rate/resource occupation rate. For example, the mapping table includes the following mappings: (QoS1, P5), (QoS2, P6), (QoS3, P7) . . . , and they may mean that a service of which a QoS requirement is QoS1 is required to work in a state that the resource collision rate/resource occupation rate is smaller than P5, a service of which a QoS requirement is QoS2 is required to work in a state that the resource collision rate/resource occupation rate is smaller than P6, and so on. At this moment, the fourth threshold value may be a certain threshold value described in the mapping table. When the D2D device finds that the present resource collision rate/resource occupation rate cannot meet QoS requirements of some services, the D2D device reports occurrence of an event to the network device. In some embodiments, the mapping table may be configured by the network device, and for example, may be sent to the first D2D device by the network device in a broadcast, multicast or unicast manner or may be sent to the first D2D device by the network device through dedicated signaling.

It is to be noted that a specific type of the present service(s) of the first D2D device is not limited in the embodiment of the application. For example, the present service(s) may be a V2V service or may be a V2X service. Descriptions will be made below with the condition that the present service is a V2V service as an example.

Alternatively, in some embodiments, in a scenario with coverage of the cellular network, if the first D2D device is in a Radio Resource Control (RRC) connected mode, the first D2D device may report this event to the network device and report its own present V2V service to the network device. In some examples, the first D2D device may also report a QoS requirement corresponding to the present V2V service to the network device. After receiving the report of the first D2D device, the network device may switch at least part of services of the first D2D device to the Uu-interface-based third working mode, to reduce the load capacity of the resources in the resource pool.

Alternatively, in some embodiments, if the first D2D device is in an idle mode, the first D2D device may enter the connected mode, then report the event that the resource collision rate/resource occupation rate is larger than the resource parameter usage threshold value to the network device and report an existing V2V service and/or a QoS requirement corresponding to the V2V service to the network device. After receiving the report of the first D2D device, the network device may switch at least part of services of the first D2D device to the Uu-interface-based third working mode, to reduce the load capacity of the resources in the resource pool.

Alternatively, in some embodiments, after entering the connected mode, the first D2D device may request the network device to re-establish part or all of its own existing V2V services (in mode-2 at present) in the Uu-interface-based third working mode, to reduce the load capacity of the resources in the resource pool and report the event that the resource collision rate/resource occupation rate is larger than the fourth threshold value to the network device.

Alternatively, in some embodiments, the network device may configure a specified terminal to periodically report the resource collision rate/resource occupation rate of a specified resource pool.

Alternatively, in some embodiments, the first D2D device may report the resource collision rate/resource occupation rate of the resource pool to the network device in the event of reporting the resource collision rate/resource occupation rate is larger than P2 to the network device.

Alternatively, in some embodiments, the first D2D device may report the resource occupation rate P1 of the resource pool to the network device in the event of reporting the resource occupation rate is smaller than P1 to the network device.

Alternatively, as an embodiment, when the resource usage parameter is larger than the second threshold value, the target D2D device in the resource pool performs D2D communication in the collision avoiding manner, and the target D2D device is specified by the network device and may be part or all of D2D devices in the resource pool.

Alternatively, as an embodiment, when the resource usage parameter is smaller than the first threshold value, the target D2D device in the resource pool temporally stopping using the resources in the resource pool, the target D2D device may be specified by the network device or may be a D2D device of which the priority of the transmitted content is lower than the priority threshold value which is preset or indicated by the network device, and the target D2D device may be part or all of the D2D devices using the resource pool.

Alternatively, as an embodiment, when the resource usage parameter is larger than the second threshold value, the target D2D device in the resource pool stops D2D communication, and the target D2D device is specified by the network device and may be part or all of the D2D devices in the resource pool.

Alternatively, as an embodiment, when the resource usage parameter is smaller than the second threshold value and larger than the third threshold value, the target D2D device in the resource pool performs D2D communication in the collision avoiding manner, and the target D2D device is specified by the network device and may be part or all of the D2D devices in the resource pool.

Alternatively, as an embodiment, when the resource usage parameter is smaller than the second threshold value and larger than the third threshold value, the target D2D device in the resource pool stops D2D communication, and the target D2D device is specified by the network device and may be part or all of the D2D devices in the resource pool.

Alternatively, as an embodiment, the method of FIG. 1 may further include that: when the resource usage parameter is larger than the second threshold value, the D2D device performs D2D communication in the collision avoiding manner.

Alternatively, as an embodiment, the method of FIG. 1 may further include that: when the resource usage parameter is larger than the second threshold value, the D2D device stops D2D communication.

Alternatively, as an embodiment, the method of FIG. 1 may further include that: when the resource usage parameter is smaller than the second threshold value and larger than the third threshold value, the D2D device performs D2D communication in the collision avoiding manner.

Alternatively, as an embodiment, the method of FIG. 1 may further include that: when the resource usage parameter is smaller than the second threshold value and larger than the third threshold value, the D2D device stops D2D communication. The D2D communication method according to the embodiments of the application has been described above in combination with FIG. 1 from the D2D device side in detail, and the D2D communication method according to the embodiments of the application will be described below in combination with FIG. 2 from the network device side. It is to be understood that descriptions made from the network device side and the D2D device side mutually correspond and thus undetailed parts may be seen from the embodiment of FIG. 1.

Figure 2:
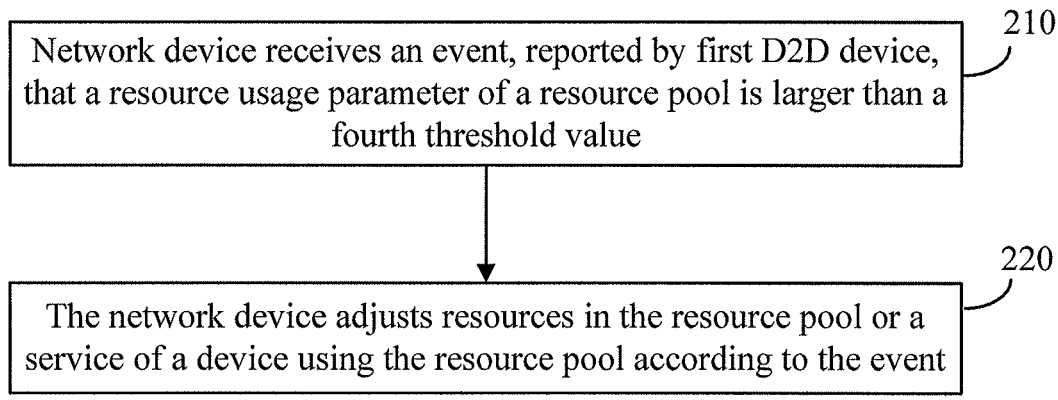
FIG. 2 illustrates a schematic flowchart of a D2D communication method according to an embodiment of the application.

FIG. 2 illustrates a schematic flowchart of a D2D communication method according to an embodiment of the application. The method includes the following operations.

In 210, a network device receives an event, reported by a first D2D device, that a resource usage parameter of a resource pool is larger than a fourth threshold value. The resource pool is used for D2D communication, the resource usage parameter indicates a proportion of an occupied resource of the resource pool to total resources of the resource pool, or the resource usage parameter indicates a proportion of a collision resource of the resource pool to the total resources of the resource pool, and the collision resource is a resource, that is simultaneously occupied by multiple D2D signals, in the resource pool.

In 220, the network device adjusts the resources in the resource pool or a service(s) of device(s) using the resource pool according to the event that the resource usage parameter of the resource pool is larger than the fourth threshold value.

Alternatively, as an embodiment, the method of FIG. 2 further includes that the network device receives a present service(s) reported by the first D2D device.

Alternatively, as an embodiment, the method of FIG. 2 further includes that the network device receives a request message sent by the first D2D device, the request message being configured to request the network device to switch a working mode in which the first D2D device processes a target service from a second working mode to a third working mode, the target service is at least part of the present service(s) of the first D2D device, a resource used by the first D2D device in the second working mode is autonomously selected by the first D2D device, and the first D2D device in the third working mode performs D2D communication on the basis of a cellular network interface.

Alternatively, as an embodiment, the method of FIG. 2 may further include that: the network device receives a QoS requirement corresponding to at least part of the present service(s) reported by the first D2D device.

Alternatively, as an embodiment, the operation that the network device adjusts the resources in the resource pool or the service of the device using the resource pool according to the event includes that: the network device switches a working mode in which the first D2D device processes at least part of the present service(s) from the second working mode to the third working mode according to the event, the resource used by the first D2D device in the second working mode is autonomously selected by the first D2D device, and the first D2D device in the third working mode performs D2D communication on the basis of the cellular network interface.

Alternatively, as an embodiment, the present service(s) is a present V2V service(s) of the first D2D device.

Alternatively, as an embodiment, the event that the resource usage parameter of the resource pool is larger than the fourth threshold value is determined by the first D2D device on the basis of a configured mapping table. The mapping table indicates a mapping between the QoS requirement corresponding to the present service(s) of the first D2D device and the fourth threshold value.

Alternatively, as an embodiment, the method of FIG. 2 further includes that the network device receives a resource usage parameter, periodically reported by the first D2D device, of a target resource pool.

Alternatively, as an embodiment, the method of FIG. 2 further includes that: when the resource usage parameter is larger than the fourth threshold value, the network device receives the resource usage parameter reported by the first D2D device.

The D2D communication method according to the embodiments of the application has been described above in combination with FIG. 1 and FIG. 2 in detail, and D2D device according to the embodiments of the application will be described below in combination with FIG. 3 and FIG. 4 in detail. It is to be understood that the D2D device described in FIG. 3 and FIG. 4 may execute each operation executed by a first D2D device and will not be elaborated herein to avoid repetitions.

A device embodiment of the application will be described below. Since the device embodiment may execute the above-mentioned method, undetailed parts may refer to each method embodiment mentioned before.

Figure 3:
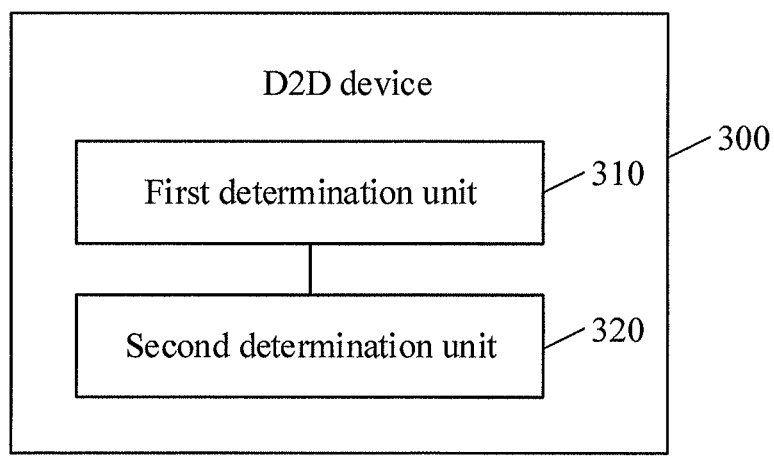
FIG. 3 illustrates a schematic structure diagram of a D2D device according to an embodiment of the application.

FIG. 3 illustrates a schematic structure diagram of a D2D device according to an embodiment of the application. The D2D device 300 of FIG. 3 includes a first determination unit 310 and a second determination unit 320.

The first determination unit 310 is configured to determine a target resource in a resource pool. The resource pool is used for D2D communication and the target resource is an occupied resource in the resource pool or a collision resource in the resource pool, and the collision resource is a resource, that is simultaneously occupied by multiple D2D signals, in the resource pool; and The second determination unit 320 is configured to determine a resource usage parameter of the resource pool according to the target resource. The resource usage parameter indicates a proportion of the occupied resource to total resources of the resource pool, or the resource usage parameter indicates a proportion of the collision resource to the total resources of the resource pool.

Alternatively, as an embodiment, the D2D device further includes a first reporting unit configured to, when the resource usage parameter is smaller than a first threshold value, report an event that the resource usage parameter is smaller than the first threshold value to network device.

Alternatively, as an embodiment, the D2D device further includes a second reporting unit, configured to, when the resource usage parameter is smaller than the first threshold value over a preset time period, report the event that the resource usage parameter is smaller than the first threshold value to the network device.

Alternatively, as an embodiment, the event that the resource usage parameter is smaller than the first threshold value is used to trigger the network device to shrink the resource pool or combine the resource pool with one or more other resource pools.

Alternatively, as an embodiment, the D2D device further includes: a temporary stopping unit, configured to, after the event that the resource usage parameter is smaller than the first threshold value is reported to the network device, temporally stop using the target resource.

Alternatively, as an embodiment, the temporary stopping unit is specifically configured to after the event that the resource usage parameter is smaller than the first threshold value is reported to the network device, receive first indication information sent by the network device. The first indication information indicates the D2D device to temporally stop using the resource pool; and temporally stop using the target resource according to the first indication information.

Alternatively, as an embodiment, the D2D device further includes a third reporting unit, configured to, when the resource usage parameter is larger than a second threshold value, report an event that the resource usage parameter is larger than the second threshold value to the network device, so as for the network device to reconfigure the resources of the resource pool.

Alternatively, as an embodiment, the D2D device further includes a selection unit, configured to, when the resource usage parameter is larger than the second threshold value, reselect a resource pool.

Alternatively, as an embodiment, the D2D device further includes a fourth reporting unit, configured to, when the resource usage parameter is smaller than the second threshold value and larger than a third threshold value, report an event that the resource usage parameter is smaller than the second threshold value and larger than the third threshold value to the network device, so as for the network device to indicate D2D device(s) in the resource pool to use the resources in the resource pool in a collision avoiding manner.

Alternatively, as an embodiment, the D2D device further includes a first sending unit configured to, when the resource usage parameter is smaller than the second threshold value and larger than the third threshold value, send second indication information to the other D2D device in the resource pool, the second indication information indicates the other D2D device to use the resources in the resource pool in the collision avoiding manner.

Alternatively, as an embodiment, the D2D device further includes: a fifth reporting unit, configured to, when the resource usage parameter is smaller than the second threshold value and larger than the third threshold value, report the event that the resource usage parameter is smaller than the second threshold value and larger than the third threshold value to the network device for the network device to reconfigure the resources in the resource pool.

Alternatively, as an embodiment, the second determination unit 320 is specifically configured to receive scheduling information sent by another D2D device in the resource pool on a preset resource of the resource pool, the scheduling information indicating a location of a resource bearing data of the other D2D device in the resource pool; and determine the resource usage parameter according to the scheduling information.

Alternatively, as an embodiment, the second determination unit 320 is specifically configured to detect power of a D2D signal using a resource in the resource pool; and determine the resource usage parameter according to the power of the D2D signal.

Alternatively, as an embodiment, content transmitted by each D2D device in the resource pool has a priority, and the D2D device further includes a communication unit, configured to, when the resource usage parameter is larger than the second threshold value, perform D2D communication in the collision avoiding manner or stop D2D communication; or, the communication unit is further configured to, when the resource usage parameter is smaller than the second threshold value and larger than the third threshold value, perform D2D communication in the collision avoiding manner or stop D2D communication, where a priority of content transmitted by the first D2D device in the resource pool is lower than or equal to a priority threshold value.

Alternatively, as an embodiment, information about the priority of the content transmitted by each D2D device in the resource pool is contained in scheduling information sent by the each D2D device on a preset resource.

Alternatively, as an embodiment, the resource pool is configured with at least one threshold value corresponding to the resource usage parameter.

Alternatively, as an embodiment, the D2D device further includes a receiving unit, configured to receive third indication information sent by the network device, the third indication information indicates the D2D device of which the priority of the transmitted content is lower than or equal to the priority threshold value in the resource pool to perform D2D communication in the collision avoiding manner or stop D2D communication; and the communication unit is specifically configured to perform D2D communication in the collision avoiding manner or stop D2D communication according to the third indication information.

Alternatively, as an embodiment, the D2D device further includes a second sending unit, configured to, when the resource usage parameter is larger than a fourth threshold value, report an event that the resource usage parameter is larger than the fourth threshold value to the network device.

Alternatively, as an embodiment, the D2D device further includes: a third sending unit, configured to, when the resource usage parameter is larger than the fourth threshold value, report a present service(s) of the D2D device to the network device, so for the network device to switch a working mode in which the D2D device processes at least part of the present service(s) from the second working mode to the third working mode. The resource used by the D2D device in the second working mode is autonomously selected by the D2D device, and the D2D device in the third working mode performs D2D communication on the basis of a cellular network interface.

Alternatively, as an embodiment, the D2D device further includes: a fourth sending unit, configured to, when the resource usage parameter is larger than the fourth threshold value, send a request message to the network device. The request message is configured to request the network device to switch a working mode in which the D2D device processes a target service from the second working mode to the third working mode, the target service is at least part of the present service(s) of the D2D device, the resource used by the D2D device in the second working mode is autonomously selected by the D2D device, and the D2D device in the third working mode performs D2D communication on the basis of the cellular network interface.

Alternatively, as an embodiment, the D2D device further includes a fifth sending unit, configured to, when the resource usage parameter is larger than the fourth threshold value, report a QoS requirement corresponding to at least part of the present service(s) to the network device.

Alternatively, as an embodiment, the present service(s) is/are a present V2V service(s) of the D2D device.

Alternatively, as an embodiment, the D2D device further includes a third determination unit, configured to determine the fourth threshold value according to a QoS requirement of the present service(s) and a configured mapping table. The mapping table indicates a mapping between the QoS requirement and the fourth threshold value.

Alternatively, as an embodiment, the D2D device further includes a sixth sending unit, configured for the D2D device to periodically report the resource usage parameter of the resource pool to the network device.

Alternatively, as an embodiment, the D2D device further includes a seventh sending unit, configured for the D2D device to, when the resource usage parameter is larger than the fourth threshold value, report the resource usage parameter to the network device.

Figure 4:
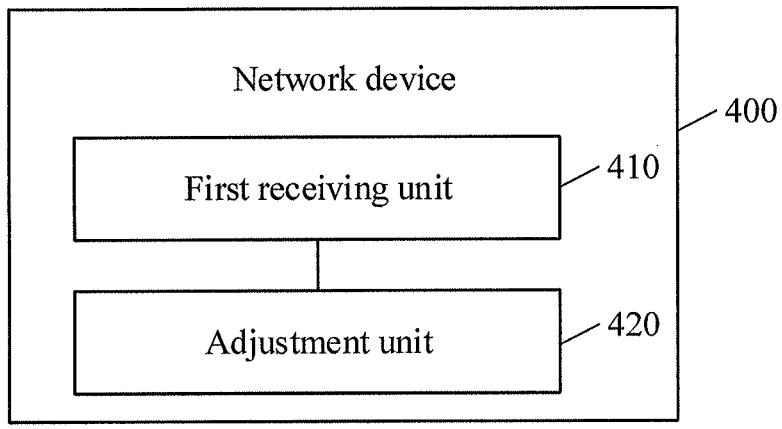
FIG. 4 illustrates a schematic structure diagram of network device according to an embodiment of the application.

FIG. 4 illustrates a schematic structure diagram of network device according to an embodiment of the application. The network device 400 of FIG. 4 includes a first receiving unit 410 and an adjustment unit 420.

The first receiving unit 410 is configured to receive an event, reported by a first D2D device, that a resource usage parameter of a resource pool is larger than a fourth threshold value. The resource pool is any resource pool in resource pools for D2D communication, the resource usage parameter indicates a proportion of an occupied resource of the resource pool to total resources of the resource pool, or the resource usage parameter indicates a proportion of a collision resource of the resource pool to the total resources of the resource pool, and the collision resource is a resource, that is simultaneously occupied by multiple D2D signals, in the resource pool; and The adjustment unit 420 is configured to adjust the resources in the resource pool or a service of device using the resource pool according to the event.

Alternatively, as an embodiment, the network device further includes a second receiving unit, configured to receive a present service(s) reported by the first D2D device.

Alternatively, as an embodiment, the network device further includes a third receiving unit, configured to receive a request message sent by the first D2D device. The request message is configured to request the network device to switch a working mode in which the first D2D device processes a target service from a second working mode to a third working mode, the target service is at least part of the present service(s) of the first D2D device, a resource used by the first D2D device in the second working mode is autonomously selected by the first D2D device, and the first D2D device in the third working mode performs D2D communication on the basis of a cellular network interface.

Alternatively, as an embodiment, the network device further includes a fourth receiving unit, configured to receive a QoS requirement corresponding to at least part of the present service(s) reported by the first D2D device.

Alternatively, as an embodiment, the adjustment unit specifically switches a working mode in which the first D2D device processes at least part of the present service(s) from the second working mode to the third working mode according to the event. The resource used by the first D2D device in the second working mode is autonomously selected by the first D2D device, and the first D2D device in the third working mode performs D2D communication on the basis of the cellular network interface.

Alternatively, as an embodiment, the present service(s) is/are a present V2V service(s) of the first D2D device.

Alternatively, as an embodiment, the event that the resource usage parameter of the resource pool is larger than the fourth threshold value is determined by the first D2D device on the basis of a configured mapping table. The mapping table indicates a mapping between the QoS requirement corresponding to the present service(s) of the first D2D device and the fourth threshold value.

Alternatively, as an embodiment, the network device further includes a fifth receiving unit, configured to receive a resource usage parameter, periodically reported by the first D2D device, of a target resource pool.

Alternatively, as an embodiment, the network device further includes a sixth receiving unit, configured to, when the resource usage parameter is larger than the fourth threshold value, receive the resource usage parameter reported by the first D2D device.

Figure 5:
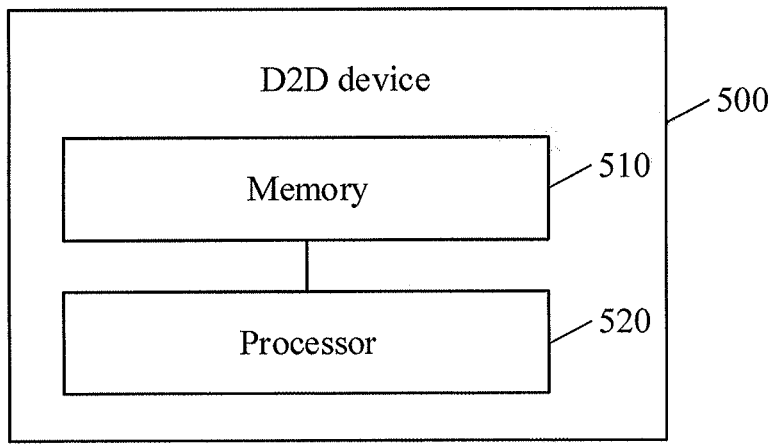
FIG. 5 illustrates a schematic structure diagram of a D2D device according to an embodiment of the application.

FIG. 5 illustrates a schematic structure diagram of a D2D device according to an embodiment of the application. The D2D device 500 of FIG. 5 includes: a memory 510, configured to store a program; and a processor 520, configured to execute the program stored in the memory 510, the program, when being executed, causes the processor 520 to determine a target resource in a resource pool, the resource pool being used for D2D communication, the target resource being an occupied resource in the resource pool or a collision resource in the resource pool and the collision resource being a resource, that is simultaneously occupied by multiple D2D signals, in the resource pool, and determine a resource usage parameter of the resource pool according to the target resource. The resource usage parameter indicates a proportion of the occupied resource to total resources of the resource pool, or the resource usage parameter indicates a proportion of the collision resource to the total resources of the resource pool.

Alternatively, as an embodiment, the D2D device 500 further includes a transceiver 530, configured to, when the resource usage parameter is larger than a fourth threshold value, report an event that the resource usage parameter is larger than the fourth threshold value to a network device.

Alternatively, as an embodiment, the transceiver 530 is further configured to, when the resource usage parameter is smaller than a first threshold value, report an event that the resource usage parameter is smaller than the first threshold value to the network device.

Alternatively, as an embodiment, the transceiver 530 is further configured to, when the resource usage parameter is smaller than the first threshold value over a preset time period, report the event that the resource usage parameter is smaller than the first threshold value to the network device.

Alternatively, as an embodiment, the event that the resource usage parameter is smaller than the first threshold value is used to trigger the network device to shrink the resource pool or combine the resource pool with one or more other resource pools.

Alternatively, as an embodiment, the processor 520 is further configured to, after the event that the resource usage parameter is smaller than the first threshold value is reported to the network device, temporally stop using the target resource.

Alternatively, as an embodiment, the transceiver 530 is further configured to, after the event that the resource usage parameter is smaller than the first threshold value is reported to the network device, receive first indication information sent by the network device, the first indication information indicates the D2D device to temporally stop using the resource pool; and the processor 520 is further configured to temporally stop using the target resource according to the first indication information.

Alternatively, as an embodiment, the transceiver 530 is further configured to, when the resource usage parameter is larger than a second threshold value, report an event that the resource usage parameter is larger than the second threshold value to the network device, so as for the network device to reconfigure the resources of the resource pool.

Alternatively, as an embodiment, the processor 520 is further configured to, when the resource usage parameter is larger than the second threshold value, reselect a resource pool.

Alternatively, as an embodiment, the transceiver 530 is further configured to, when the resource usage parameter is smaller than the second threshold value and larger than a third threshold value, report an event that the resource usage parameter is smaller than the second threshold value and larger than the third threshold value to the network device, so as for the network device to indicate D2D device(s) in the resource pool to use the resources in the resource pool in a collision avoiding manner.

Alternatively, as an embodiment, the transceiver 530 is further configured to, when the resource usage parameter is smaller than the second threshold value and larger than the third threshold value, send second indication information to one or more other D2D device(s) in the resource pool, the second indication information indicates the other D2D device(s) to use the resources in the resource pool in the collision avoiding manner.

Alternatively, as an embodiment, the transceiver 530 is further configured to, when the resource usage parameter is smaller than the second threshold value and larger than the third threshold value, report the event that the resource usage parameter is smaller than the second threshold value and larger than the third threshold value to the network device, so as for the network device to reconfigure the resources in the resource pool.

Alternatively, as an embodiment, the processor 520 is specifically configured to receive scheduling information sent by another D2D device in the resource pool on a preset resource in the resource pool, the scheduling information indicating a location of a resource for carrying data of the another D2D device in the resource pool; and determine the resource usage parameter according to the scheduling information.

Alternatively, as an embodiment, the processor 520 is further specifically configured to detect power of a D2D signal using a resource in the resource pool; and determine the resource usage parameter according to the power of the D2D signal:

Alternatively, as an embodiment, content transmitted by each D2D device in the resource pool has a priority, and the processor 520 is further configured to, when the resource usage parameter is larger than the second threshold value, perform D2D communication in the collision avoiding manner or stop D2D communication; or, the processor 520 is further configured to, when the resource usage parameter is smaller than the second threshold value and larger than the third threshold value, perform D2D communication in the collision avoiding manner or stop D2D communication, a priority of content transmitted by the D2D device 500 in the resource pool is lower than or equal to a priority threshold value.

Alternatively, as an embodiment, information about the priority of the content transmitted by each D2D device in the resource pool is contained in scheduling information sent by the each D2D device on a preset resource.

Alternatively, as an embodiment, the transceiver 530 is configured to receive third indication information sent by the network device, the third indication information indicates the D2D device of which the priority of the transmitted content is lower than or equal to the priority threshold value in the resource pool to perform D2D communication in the collision avoiding manner or stop D2D communication; and the processor 520 is further specifically configured to perform D2D communication in the collision avoiding manner or stop D2D communication according to the third indication information.

Alternatively, as an embodiment, the resource pool is configured with at least one threshold value corresponding to the resource usage parameter.

Alternatively, as an embodiment, the transceiver 530 is further configured to, when the resource usage parameter is larger than the fourth threshold value, report the event that the resource usage parameter is larger than the fourth threshold value to the network device, so as for the network device to switch a working mode in which the D2D device processes at least part of a present service(s) from a second working mode to a third working mode. A resource used by the D2D device in the second working mode is autonomously selected by the D2D device, and the D2D device in the third working mode performs D2D communication on the basis of a cellular network interface.

Alternatively, as an embodiment, the transceiver 530 is further configured to, when the resource usage parameter is larger than the fourth threshold value, send a request message to the network device. The request message is configured to request the network device to switch a working mode in which the D2D device processes a target service from the second working mode to the third working mode. The target service is at least part of the present service(s) of the D2D device, the resource used by the D2D device in the second working mode is autonomously selected by the D2D device, and the D2D device in the third working mode performs D2D communication on the basis of the cellular network interface.

Alternatively, as an embodiment; the transceiver 530 is further configured to, when the resource usage parameter is larger than the fourth threshold value, report a QoS requirement corresponding to at least part of the present service(s) to the network device.

Alternatively, as an embodiment, the present service(s) is a present V2V service(s) of the D2D device.

Alternatively, as an embodiment, the processor 520 is further configured to determine the fourth threshold value according to a QoS requirement of the present service(s) and a configured mapping table. The mapping table indicates a mapping between the QoS requirement and the fourth threshold value.

Alternatively, as an embodiment, the transceiver 530 is further configured for the D2D device to periodically report the resource usage parameter of the resource pool to the network device.

Alternatively, as an embodiment, the transceiver 530 is further configured for the D2D device to, when the resource usage parameter is larger than the fourth threshold value, report the resource usage parameter to the network device.

Figure 6:
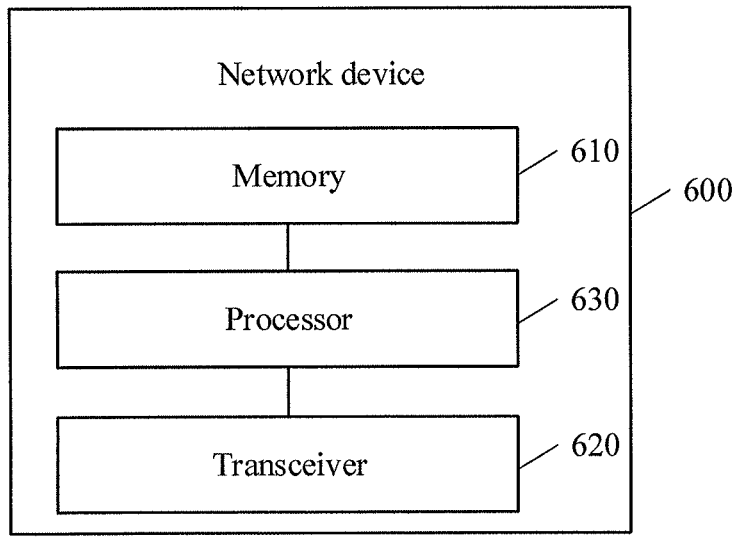
FIG. 6 illustrates a schematic structure diagram of a network device according to an embodiment of the application.

FIG. 6 illustrates a schematic structure diagram of a network device according to an embodiment of the application. The network device 600 of FIG. 6 includes: a memory 610, configured to store a program; a transceiver 620, configured to receive an event, reported by D2D device, that a resource usage parameter of a resource pool is larger than a fourth threshold value. The resource pool is used for D2D communication, the resource usage parameter indicates a proportion of an occupied resource of the resource pool to total resources of the resource pool, or the resource usage parameter indicates a proportion of a collision resource of the resource pool to the total resources of the resource pool, the collision resource is a resource, that is simultaneously occupied by multiple D2D signals, in the resource pool; and a processor 630, configured to execute the program in the memory 610, the program being executed to enable the processor 630 to adjust the resources in the resource pool or a service of device using the resource pool according to the event.

Alternatively, as an embodiment, the transceiver 620 is further configured to receive a present service(s) reported by the D2D device.

Alternatively, as an embodiment, the transceiver 620 is further configured to receive a request message sent by the D2D device. The request message is configured to request the network device to switch a working mode in which the D2D device processes a target service from a second working mode to a third working mode. The target service is at least part of the present service(s) of the D2D device, a resource used by the D2D device in the second working mode is autonomously selected by the D2D device, and the D2D device in the third working mode performs D2D communication on the basis of a cellular network interface.

Alternatively, as an embodiment, the transceiver 620 is further configured to receive a QoS requirement corresponding to at least part of the present service(s) reported by the first D2D device.

Alternatively, as an embodiment, the processor 630 is specifically configured to switch a working mode in which the D2D device processes at least part of the present service(s) from the second working mode to the third working mode according to the event. The resource used by the D2D device in the second working mode is autonomously selected by the D2D device, and the D2D device in the third working mode performs D2D communication on the basis of the cellular network interface.

Alternatively, as an embodiment, the present service(s) is a present V2V service of the first D2D device.

Alternatively, as an embodiment, the event that the resource usage parameter of the resource pool is larger than the fourth threshold value is determined by the D2D device on the basis of a configured mapping table. The mapping table indicates a mapping between the QoS requirement corresponding to the present service(s) of the D2D device and the fourth threshold value.

Alternatively, as an embodiment, the transceiver 620 is further configured to receive a resource usage parameter, periodically reported by the D2D device, of a target resource pool. Alternatively, as an embodiment, the transceiver 620 is further configured to, when the resource usage parameter is larger than the fourth threshold value, receive the resource usage parameter reported by the D2D device.

Those of ordinary skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the application may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A Device to Device (D2D) communication method, comprising:
    determining, by a first D2D device, a target resource from a resource pool, wherein the resource pool is used for D2D communication and the target resource is an occupied resource in the resource pool or a collision resource in the resource pool, wherein the collision resource is a resource, that is simultaneously occupied by multiple D2D signals, in the resource pool; and
    determining, by the first D2D device, a resource usage parameter of the resource pool according to the target resource, wherein the resource usage parameter indicates a proportion of the occupied resource to total resources of the resource pool, or a proportion of the collision resource to the total resources of the resource pool; and
    wherein content transmitted by each D2D device in the resource pool has a priority, and
    when the resource usage parameter is larger than a second threshold value, the first D2D device performs D2D communication in a collision avoiding manner or stops D2D communication.

2. The method according to claim 1, further comprising:
    when the resource usage parameter is smaller than a first threshold value, reporting, by the first D2D device, an event that the resource usage parameter is smaller than the first threshold value to a network device.

3. The method according to claim 2, wherein the event that the resource usage parameter is smaller than the first threshold value is used to trigger the network device to shrink the resource pool or combine the resource pool with one or more other resource pools, and
    wherein after reporting, by the first D2D device, the event that the resource usage parameter is smaller than the first threshold value to the network device, the method further comprises:
    temporally stopping, by the first D2D device, using the resource pool, comprising:
        receiving, by the first D2D device, first indication information sent by the network device, wherein the first indication information indicates the D2D device to temporally stop using the resource pool; and
        temporally stopping, by the first D2D device, using the resource pool according to the first indication information.

4. The method according to claim 1, further comprising:
    when the resource usage parameter is smaller than the first threshold value over a preset time period, reporting, by the first D2D device, the event that the resource usage parameter is smaller than the first threshold value to a network device.

5. The method according to claim 1, further comprising:
when the resource usage parameter is larger than the second threshold value,
    reporting, by the first D2D device, an event that the resource usage parameter is larger than the second threshold value to a network device, so as for the network device to reconfigure the resources in the resource pool.

6. The method according to claim 1, further comprising:
    when the resource usage parameter is larger than the second threshold value, reselecting, by the first D2D device, a resource pool.

7. The method according to claim 1, further comprising:
when the resource usage parameter is smaller than the second threshold value and larger than a third threshold value, performing, by the first D2D device, at least one of the following:
    reporting, by the first D2D device, an event that the resource usage parameter is smaller than the second threshold value and larger than the third threshold value to a network device, so as for the network device to indicate D2D devices in the resource pool to use the resources in the resource pool in a collision avoiding manner;
    sending second indication information to one or more other D2D devices in the resource pool, wherein the second indication information indicates the other D2D devices to use the resources in the resource pool in a collision avoiding manner;
    reporting the event that the resource usage parameter is smaller than the second threshold value and larger than the third threshold value to a network device, so as for the network device to reconfigure the resources in the resource pool.

8. The method according to claim 1, wherein determining, by the first D2D device, the resource usage parameter of the resource pool comprises:
    receiving, by the first D2D device, scheduling information sent by another D2D device in the resource pool on a preset resource of the resource pool, wherein the scheduling information indicate a location of a resource for carrying data of the another D2D device in the resource pool; and
    determining, by the D2D device, the resource usage parameter according to the scheduling information.

9. The method according to claim 1, wherein determining, by the first D2D device, the resource usage parameter of the resource pool comprises:
    detecting, by the first D2D device, power of a D2D signal using a resource in the resource pool; and
    determining, by the first D2D device, the resource usage parameter according to the power of the D2D signal.

10. The method according to claim 1, wherein information about the priority of the content transmitted by each D2D device in the resource pool is contained in scheduling information sent by the each D2D device on a preset resource.

11. The method according to claim 1, further comprising:
receiving, by the first D2D device, third indication information sent by the network device, wherein the third indication information indicates the D2D device, of which the priority of the transmitted content is lower than or equal to a priority threshold value, in the resource pool, to perform D2D communication in the collision avoiding manner or stop D2D communication; and
performing, by the first D2D device, D2D communication in the collision avoiding manner or stopping, by the first D2D device, the D2D communication, according to the third indication information.

12. The method according to claim 1, further comprising:
obtaining, by the first D2D device, a mapping relationship for indicating a Quality of Service (QoS) requirement of at least one service of the first D2D device and a fourth threshold value of the resource usage parameter.

13. The method according to claim 12, further comprising:
determining, by the first D2D device, the fourth threshold value according to a QoS requirement of a present service of the first D2D device and the mapping relationship;
when the resource usage parameter is larger than the fourth threshold value, transmitting at least one of the following to the network device:
the present service;
a QoS requirement of at least a first part of the present service;
the resource usage parameter; or
a request for switching a working mode in which the first D2D device processes at least a second part of the present service to a mode of performing D2D communication on the basis of a cellular network interface.

14. The method according to claim 1, wherein the resource usage parameter indicates a proportion of the occupied resource to total resources of the resource pool in a specific time period, or a proportion of the collision resource to the total resources of the resource pool in the specific time period.

15. A Device to Device (D2D) device, comprising:
a memory, configured to store a computer program; and
a processor, configured to execute the computer program stored in the memory, wherein the program, when being executed, causes the processor to perform a method, the method comprising:
determining a target resource from a resource pool, wherein the resource pool is used for D2D communication and the target resource is an occupied resource in the resource pool or a collision resource in the resource pool, wherein the collision resource is a resource, that is simultaneously occupied by multiple D2D signals, in the resource pool; and
determining a resource usage parameter of the resource pool according to the target resource, wherein the resource usage parameter indicate a proportion of the occupied resource to total resources of the resource pool, or the resource usage parameter is configured to indicate a proportion of the collision resource to the total resources of the resource pool; and
wherein content transmitted by each D2D device in the resource pool has a priority, and
when the resource usage parameter is larger than a second threshold value, the D2D device performs D2D communication in a collision avoiding manner or stops D2D communication.

16. The D2D device according to claim 15, wherein the method further comprises:
when the resource usage parameter is smaller than a first threshold value, reporting an event that the resource usage parameter is smaller than the first threshold value to a network device.

17. The D2D device according to claim 16, wherein the event that the resource usage parameter is smaller than the first threshold value is used to trigger the network device to shrink the resource pool or combine the resource pool with one or more other resource pools, and
wherein after reporting the event that the resource usage parameter is smaller than the first threshold value to the network device, the method further comprises:
temporally stopping using the resource pool, comprising:
receiving first indication information sent by the network device, wherein the first indication information indicates the D2D device to temporally stop using the resource pool; and
temporally stopping using the resource pool according to the first indication information.

18. The D2D device according to claim 15, wherein the method further comprises:
when the resource usage parameter is smaller than the first threshold value over a preset time period, reporting the event that the resource usage parameter is smaller than the first threshold value to a network device.

19. The D2D device according to claim 15, wherein the method further comprises: when the resource usage parameter is larger than the second threshold value,
reporting an event that the resource usage parameter is larger than the second threshold value to a network device, so as for the network device to reconfigure the resources in the resource pool.

20. The D2D device according to claim 15, further comprising:
when the resource usage parameter is larger than the second threshold value, reselecting a resource pool.

21. The D2D device according to claim 15, wherein the method further comprises: when the resource usage parameter is smaller than the second threshold value and larger than a third threshold value, performing at least one of the following:
reporting an event that the resource usage parameter is smaller than the second threshold value and larger than the third threshold value to a network device, so as for the network device to indicate D2D devices in the resource pool to use the resources in the resource pool in a collision avoiding manner;
sending second indication information to one or more other D2D devices in the resource pool, wherein the second indication information indicates the other D2D devices to use the resources in the resource pool in a collision avoiding manner;
reporting the event that the resource usage parameter is smaller than the second threshold value and larger than the third threshold value to a network device, so as for the network device to reconfigure the resources in the resource pool.

22. The D2D device according to claim 15, wherein determining the resource usage parameter of the resource pool comprises:
 receiving scheduling information sent by another D2D device in the resource pool on a preset resource of the resource pool, wherein the scheduling information indicate a location of a resource for carrying data of the another D2D device in the resource pool; and
 determining the resource usage parameter according to the scheduling information.

23. The D2D device according to claim 15, wherein determining the resource usage parameter of the resource pool comprises:
 detecting power of a D2D signal using a resource in the resource pool; and
 determining the resource usage parameter according to the power of the D2D signal.

24. The D2D device according to claim 1, wherein information about the priority of the content transmitted by each D2D device in the resource pool is contained in scheduling information sent by the each D2D device on a preset resource.

25. The D2D device according to claim 15, wherein the method further comprises:
 receiving third indication information sent by the network device, wherein the third indication information indicates the D2D device, of which the priority of the transmitted content is lower than or equal to a priority threshold value, in the resource pool, to perform D2D communication in the collision avoiding manner or stop D2D communication; and
 performing D2D communication in the collision avoiding manner or stopping the D2D communication according to the third indication information.

26. The D2D device according to claim 15, wherein the method further comprises:
 obtaining a mapping relationship for indicating a Quality of Service (QoS) requirement of at least one service of the D2D device and a fourth threshold value of the resource usage parameter.

27. The D2D device according to claim 26, wherein the method further comprises:
 determining the fourth threshold value according to a QoS requirement of a present service of the D2D device and the mapping relationship;
 when the resource usage parameter is larger than the fourth threshold value, transmitting at least one of the following to the network device:
  the present service;
  a QoS requirement of at least a first part of the present service;
  the resource usage parameter; or
  a request for switching a working mode in which the D2D device processes at least a second part of the present service to a mode of performing D2D communication on the basis of a cellular network interface.

28. The D2D device according to claim 26, wherein the mapping relationship is pre-configured by the network device, and
 wherein obtaining the mapping relationship comprises:
 receiving the mapping relationship transmitted by the network device in a broadcast, multicast or unicast manner or through dedicated signaling.

29. The method according to claim 15, wherein the resource usage parameter indicates a proportion of the occupied resource to total resources of the resource pool in a specific time period, or a proportion of the collision resource to the total resources of the resource pool in the specific time period.

30. A chip, comprising: a processor configured to call a computer program from a memory and run the computer program, to cause a device provided with the chip to execute a method, the method comprising:
 determining a target resource from a resource pool, wherein the resource pool is used for D2D communication and the target resource is an occupied resource in the resource pool or a collision resource in the resource pool, wherein the collision resource is a resource, that is simultaneously occupied by multiple D2D signals, in the resource pool; and
 determining a resource usage parameter of the resource pool according to the target resource, wherein the resource usage parameter indicate a proportion of the occupied resource to total resources of the resource pool, or the resource usage parameter is configured to indicate a proportion of the collision resource to the total resources of the resource pool; and
 wherein content transmitted by each device in the resource pool has a priority, and
 when the resource usage parameter is larger than a second threshold value, the device performs D2D communication in a collision avoiding manner or stops D2D communication.

* * * * *